(12) United States Patent
Wu et al.

(10) Patent No.: US 9,870,613 B2
(45) Date of Patent: Jan. 16, 2018

(54) DETECTION OF TOOTH CONDITION USING REFLECTANCE IMAGES WITH RED AND GREEN FLUORESCENCE

(71) Applicant: Carestream Health, Inc., Rochester, NY (US)

(72) Inventors: Yingqian Wu, Shanghai (CN); Wei Wang, Shanghai (CN); Victor C. Wong, Rochester, NY (US); Yan Zhang, Shanghai (CN)

(*) Notice: Subject to any disclaimer, the term of this patent is extended or adjusted under 35 U.S.C. 154(b) by 66 days.

(21) Appl. No.: 14/933,294

(22) Filed: Nov. 5, 2015

(65) Prior Publication Data

US 2016/0125601 A1 May 5, 2016

Related U.S. Application Data

(60) Provisional application No. 62/075,283, filed on Nov. 5, 2014.

(51) Int. Cl.
| | |
|---|---|
| *G06K 9/00* | (2006.01) |
| *G06T 7/00* | (2017.01) |
| *H04N 5/225* | (2006.01) |

(52) U.S. Cl.
CPC ......... *G06T 7/0012* (2013.01); *H04N 5/2256* (2013.01); *G06T 2207/10024* (2013.01); *G06T 2207/10064* (2013.01); *G06T 2207/10152* (2013.01); *G06T 2207/30036* (2013.01); *H04N 2005/2255* (2013.01)

(58) Field of Classification Search
CPC ......... G06T 7/0012; G06T 2207/10152; G06T 2207/10064; G06T 2207/10024; G06T 2207/30036; H04N 5/2256; H04N 2005/2255
See application file for complete search history.

(56) References Cited

U.S. PATENT DOCUMENTS

| | | |
|---|---|---|
| 4,479,499 A | 10/1984 | Alfano |
| 4,515,476 A | 5/1985 | Ingmar |

(Continued)

FOREIGN PATENT DOCUMENTS

| | | |
|---|---|---|
| DE | 9317984 U1 | 3/1995 |
| WO | WO 2010/083623 | 7/2010 |

OTHER PUBLICATIONS

International Search Report dated Sep. 13, 2016 for International Patent Application No. PCT/US2015/058977, 3 pages.

*Primary Examiner* — John Strege
(74) *Attorney, Agent, or Firm* — Thompson Hine LLP

(57) ABSTRACT

A system and method for imaging a tooth. The method illuminates the tooth and acquires reflectance image data and illuminates the tooth and acquires fluorescence image data from the tooth. The acquired reflectance and fluorescence image data for the tooth are aligned to form aligned reflectance and fluorescence image data. For one or more pixels of the aligned reflectance and fluorescence image data, at least one feature vector is generated, having data derived from one or both of the aligned reflectance and fluorescence image data. The aligned reflectance and fluorescence image data and the at least one feature vector are processed using one or more trained classifiers obtained from a memory that is in signal communication with the computer. Processing results indicative of tooth condition are displayed.

18 Claims, 15 Drawing Sheets

(56) References Cited

U.S. PATENT DOCUMENTS

| | | | |
|---|---|---|---|
| 5,306,144 | A | 4/1994 | Hibst et al. |
| 6,231,338 | B1 | 5/2001 | de Josselin de Jong et al. |
| 7,596,253 | B2 | 9/2009 | Wong et al. |
| 2001/0010538 | A1 | 8/2001 | Ooshima et al. |
| 2004/0202356 | A1 | 10/2004 | Stookey et al. |
| 2004/0240716 | A1 | 12/2004 | de Josselin de Jong et al. |
| 2007/0099148 | A1 | 5/2007 | Wong et al. |
| 2007/0121786 | A1 | 5/2007 | Okawa et al. |
| 2008/0056551 | A1* | 3/2008 | Wong .................. A61B 5/0088 382/132 |
| 2008/0058786 | A1 | 3/2008 | Boyden et al. |
| 2008/0063998 | A1 | 3/2008 | Liang et al. |
| 2008/0170764 | A1 | 7/2008 | Burns et al. |
| 2009/0185712 | A1 | 7/2009 | Wong et al. |
| 2010/0322490 | A1* | 12/2010 | Pan ..................... A61B 5/0088 382/128 |
| 2011/0085714 | A1* | 4/2011 | Yan ..................... G06T 7/0081 382/128 |
| 2012/0148986 | A1 | 6/2012 | Yan et al. |
| 2012/0189182 | A1* | 7/2012 | Liang .................. A61C 19/00 382/131 |
| 2013/0038710 | A1* | 2/2013 | Inglese ................ A61B 5/0071 348/66 |
| 2014/0037180 | A1* | 2/2014 | Wang .................. A61B 5/0088 382/132 |
| 2015/0294066 | A1* | 10/2015 | Golay .................. G06F 19/321 433/29 |

\* cited by examiner

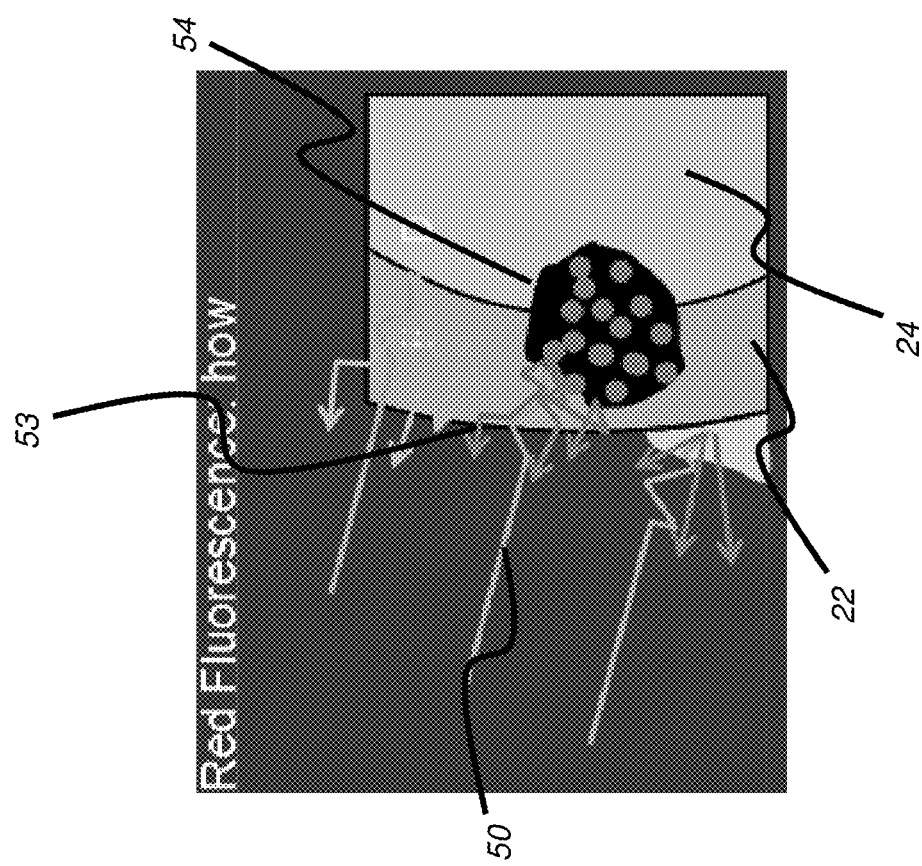
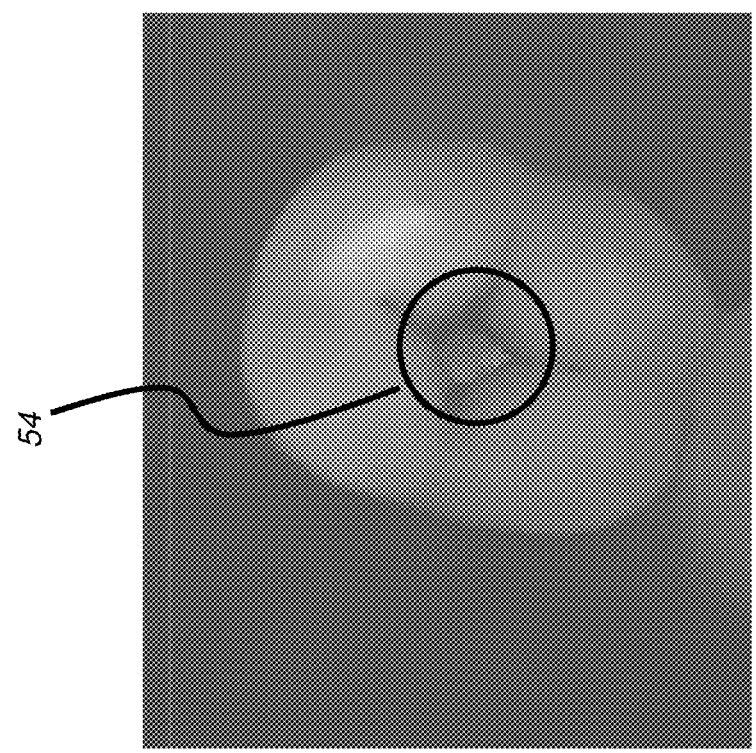
FIG. 3A
FIG. 3B

DETECTION OF TOOTH CONDITION USING REFLECTANCE IMAGES WITH RED AND GREEN FLUORESCENCE

CROSS REFERENCE TO RELATED APPLICATIONS

This application claims the benefit of U.S. Provisional application U.S. Ser. No. 62/075,283, provisionally filed on Nov. 5, 2014, entitled "DETECTION OF TOOTH CONDITION USING REFLECTANCE IMAGES WITH RED AND GREEN FLUORESCENCE", in the names of Yingqian Wu et al., which is incorporated herein by reference in its entirety.

TECHNICAL FIELD

The disclosure relates generally to the field of diagnostic imaging and more particularly relates to methods and apparatus for detection and display of suspected tooth lesions based on response of the tooth to incident light.

BACKGROUND

While there have been improvements in detection, treatment and prevention techniques, dental caries remains a prevalent condition affecting people of all age groups. If not properly and promptly treated, caries could lead to permanent tooth damage and even to loss of teeth.

Traditional methods for caries detection include visual examination and tactile probing with a sharp dental explorer device, often assisted by radiographic (x-ray) imaging. Detection using these methods can be somewhat subjective, varying in accuracy due to many factors, including practitioner expertise, location of the infected site, extent of infection, viewing conditions, accuracy of x-ray equipment and processing, and other factors. There are also hazards associated with conventional detection techniques, including the risk of damaging weakened teeth and spreading infection with tactile methods as well as exposure to x-ray radiation. By the time a caries condition is evident under visual and tactile examination, the disease is generally in an advanced stage, requiring a filling and, if not timely treated, possibly leading to tooth loss.

In response to the need for improved caries detection methods, there has been considerable interest in improved imaging techniques that do not employ x-rays. One method employs fluorescence wherein teeth are illuminated with high intensity blue light. This technique, sometimes termed quantitative light-induced fluorescence (QLF), operates on the principle that sound, healthy tooth enamel yields a higher intensity of fluorescence under excitation from some wavelengths than does de-mineralized enamel that has been damaged by caries infection. The correlation between mineral loss and loss of fluorescence for blue light excitation is then used to identify and assess carious areas of the tooth. A different relationship has been found for red light excitation, a region of the spectrum for which bacteria and bacterial by-products in carious regions absorb and fluoresce more pronouncedly than do healthy areas.

Applicants note some references related to optical detection of caries.

U.S. Pat. No. 4,515,476 (Ingmar) describes the use of a laser for providing excitation energy that generates fluorescence at some other wavelength for locating carious areas.

U.S. Pat. No. 6,231,338 (de Josselin de Jong) describes an imaging apparatus for identifying dental caries using fluorescence detection.

U.S. 2004/0240716 (de Josselin de Jong) describes methods for improved image analysis for images obtained from fluorescing tissue.

U.S. Pat. No. 4,479,499 (Alfano) describes a method for using transillumination to detect caries based on the translucent properties of tooth structure.

Products for dental imaging include QLF Clinical System from Inspektor Research Systems BV, Amsterdam, The Netherlands. The Diagnodent Laser Caries Detection Aid from KaVo Dental Corporation, Lake Zurich, Ill., USA, detects caries activity monitoring the intensity of fluorescence of bacterial by-products under illumination from red light.

U.S. 2004/0202356 (Stookey) describes mathematical processing of spectral changes in fluorescence in order to detect caries in different stages with improved accuracy. Acknowledging the difficulty of early detection when using spectral fluorescence measurements, Stookey describes approaches for enhancing the spectral values obtained, effecting a transformation of the spectral data that is adapted to the spectral response of the camera that obtains the fluorescent image.

While the described methods and apparatus can provide suitable solutions for non-invasive, non-ionizing imaging methods for caries detection, there is still room for improvement. One recognized drawback with existing techniques that employ fluorescence imaging relates to image contrast. The image provided by fluorescence generation techniques such as QLF can be difficult to assess due to relatively poor contrast between healthy and infected areas. As noted in Stookey, spectral and intensity changes for incipient caries can be very slight, making it difficult to differentiate non-diseased tooth surface irregularities from incipient caries.

Incipient caries is a lesion that has not penetrated substantially into the tooth enamel. Where such a caries lesion is identified before it threatens the dentin portion of the tooth, remineralization can often be accomplished, reversing the early damage and preventing the need for a filling. More advanced caries, however, with a lesion penetrating through the tooth enamel, grows increasingly more difficult to treat, most often requiring some type of filling or other type of intervention. Thus, detection of caries at very early stages is of particular interest for preventive dentistry.

As noted earlier, conventional techniques generally fail to detect caries at a stage at which the condition can be reversed. Accurate identification of caries can be difficult to achieve using conventional techniques, particularly in early stages. This is generally true with fluorescence imaging techniques, since the image contrast that is obtained corresponds to the severity of the caries condition. The difference in fluorescence between carious and sound tooth structure is very small for caries at an early stage. In such cases, detection accuracy using fluorescence techniques may not show marked improvement over conventional methods. Because of this shortcoming, the use of fluorescence effects appears to have some practical limits that prevent accurate diagnosis of incipient caries. As a result, a caries condition may not be detected in time, but may continue undetected until it is more serious, requiring a filling, for example.

Applicants have noted that it is beneficial to detect caries as early as is possible. In some cases, this level of detection has been found to be difficult to achieve using existing fluorescence imaging techniques, such as QLF.

In commonly-assigned U.S. 2008/0056551, a method and apparatus that employs both the reflectance and fluorescence images of the tooth is used to detect caries. The described approach takes advantage of the observed back-scattering, or reflectance, for incipient caries and, in combination with fluorescence effects, to provide an improved dental imaging technique to detect caries. The technique, referred to as Fluorescence Imaging with Reflectance Enhancement (FIRE), helps to increase the contrast of images over that of earlier approaches, and also makes it possible to detect incipient caries at stages when preventive measures are likely to take effect. Advantageously, FIRE detection can be accurate at an earlier stage of caries infection than has been exhibited using existing fluorescence approaches that measure fluorescence alone. The application describes a down-shifting method to generate the FIRE image.

Commonly-assigned PCT/CN2009/000078, entitled METHOD FOR DETECTION OF CARIES describes a morphological method for generating a FIRE image with reduced sensitivity to illumination variation.

Quantification of caries based on a digital image of a tooth, such as a fluorescence image, provides numerical information on the severity of lesion regions and can help dentists make and carry out a treatment plan. It can be useful for dentists to identify a lesion and to observe the evolution of each lesion area over time, to provide longitudinal monitoring of caries. U.S. Patent Application Publication No. 2004/0240716 has disclosed some methods for quantification of caries; however, the disclosed methods generally require manual extraction of lesion regions from sound tooth areas of the image by the user, and these methods are based on fluorescence-only images.

Manual extraction of lesion regions from the image presents two significant problems. Firstly, the extraction process is slow, requiring the user to specify numerous points, such as selecting each point with an individual mouse click, or to draw lines on the images to indicate the boundary of a lesion region. Secondly, manual extraction requires considerable caries diagnostic experience on the part of the user and is generally subjective. In addition, fluorescence-only images display incipient caries at relatively low contrast, further adding difficulty to the manual lesion extraction process. Therefore, results achieved using the disclosed methods are often compromised and provide relatively poor quantification of caries.

Existing systems and proposed solutions for automated caries detection have shown some success, but there is considered to be room for improvement. Individual detection apparatus are typically optimized for narrow functions such as advanced caries detection, while not providing assessment of other tooth conditions, such as incipient caries, plaque, and calculus. Further, utilities for supporting assessment and treatment have not been provided. Thus, for example, caries detection results taken at different intervals must be separately examined and analyzed in order to track ongoing progress of caries and its treatment over time. In addition, there is a lack of caries analysis tools designed to assist the practitioner during caries removal, such as during drilling in order to remove irreparably damaged tooth tissue.

Thus, it can be seen that there is a need for an improved method for identifying caries and other conditions in dental images.

SUMMARY

An object of the present disclosure is to provide an apparatus and methods for identifying and quantifying caries and other disease conditions in digital images of a tooth. Caries identification and analysis can be executed automatically to assist the practitioner before, during, and following treatment of the patient.

These objects are given only by way of illustrative example, and such objects may be exemplary of one or more embodiments of the invention. Other desirable objectives and advantages inherently achieved by the may occur or become apparent to those skilled in the art. The invention is defined by the appended claims.

According to one aspect of the disclosure, there is provided a method for imaging a tooth, the method executed at least in part by a computer and comprising: a) illuminating the tooth and acquiring reflectance image data of the tooth; b) illuminating the tooth and acquiring fluorescence image data from the tooth; c) aligning the acquired reflectance and fluorescence image data for the tooth to form aligned reflectance and fluorescence image data; d) for one or more pixels of the aligned reflectance and fluorescence image data, generating at least one feature vector having data derived from one or both of the aligned reflectance and fluorescence image data; e) processing the aligned reflectance and fluorescence image data and the at least one feature vector using one or more trained classifiers obtained from a memory that is in signal communication with the computer; and f) displaying processing results indicative of tooth condition.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 3A is a schematic diagram that shows the behavior of fluoresced red light for caries detection.

FIG. 3B is an image that shows incipient caries detected according to an embodiment of the present invention.

DETAILED DESCRIPTION OF THE EMBODIMENTS

Figure 1:
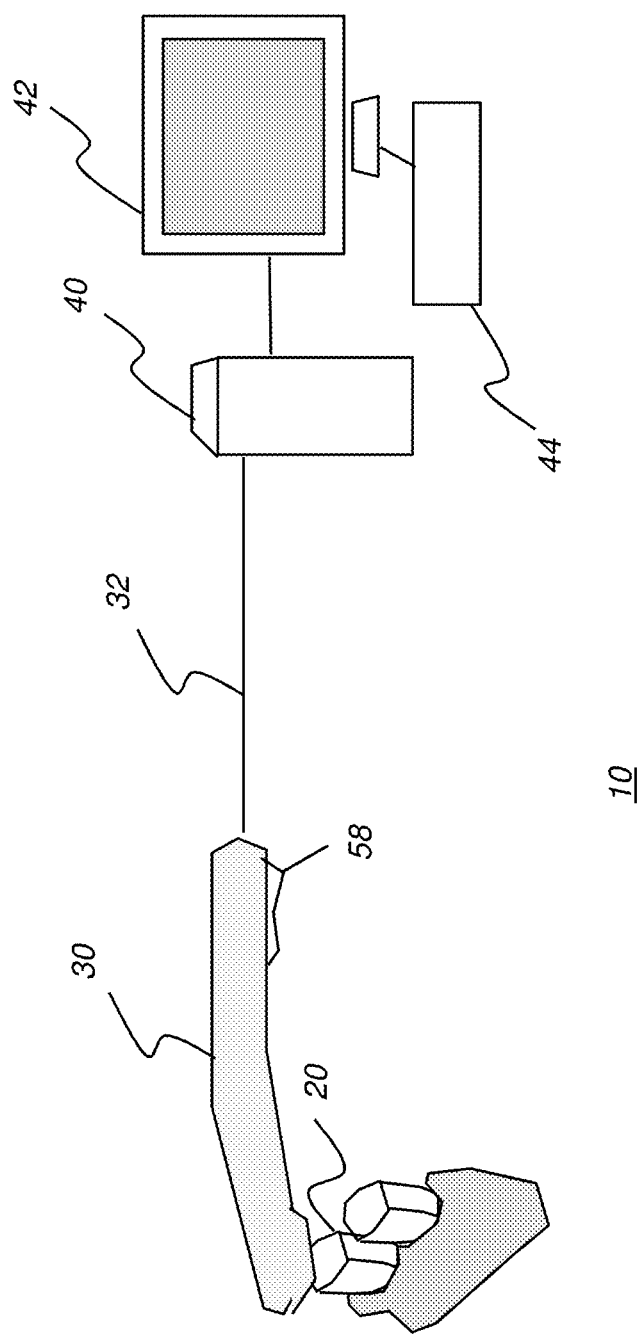
FIG. 1 is a schematic block diagram that shows a dental imaging apparatus for detection of caries and other tooth conditions according to an embodiment of the present invention.

The following is a detailed description of the preferred embodiments, reference being made to the drawings in which the same reference numerals identify the same elements of structure in each of the several figures.

The following is a detailed description of the preferred embodiments of the invention, reference being made to the drawings in which the same reference numerals identify the same elements of structure in each of the several figures.

Reference is made to PCT/CN2009/000078 (Wang), filed on Jan. 20, 2009, entitled METHOD FOR DETECTION OF CARIES.

Reference is made to U.S. 2008/0056551 (Wong), published Mar. 6, 2008, entitled METHOD FOR DETECTION OF CARIES.

Reference is made to U.S. 2008/0063998 (Liang), published Mar. 13, 2008, entitled APPARATUS FOR CARIES DETECTION.

Reference is made to U.S. 2008/0170764 (Burns), published Jul. 17, 2008, entitled SYSTEM FOR EARLY DETECTION OF DENTAL CARIES.

Reference is made to U.S. 2007/0099148 (Wong), published on May 3, 2007, entitled METHOD AND APPARATUS FOR DETECTION OF CARIES.

Reference is made to U.S. 2013/0038710 (Inglese), published on Feb. 14, 2013, entitled IDENTIFICATION OF DENTAL CARIES IN LIVE VIDEO IMAGES.

Reference is made to U.S. 2012/0148986 (Yan), published on Jun. 14, 2012, entitled METHOD FOR IDENTIFICATION OF DENTAL CARIES IN POLYCHROMATIC IMAGES.

Reference is made to U.S. 2009/0185712 (Wong) published Jul. 23, 2009, entitled METHOD FOR REAL-TIME VISUALIZATION OF CARIES CONDITION.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

In the context of the present disclosure, the term "optics" is used generally to refer to lenses and other refractive, diffractive, and reflective components used for shaping a light beam.

In the context of the present disclosure, the terms "viewer", "operator", and "user" are considered to be equivalent and refer to the viewing practitioner, technician, or other person who views and manipulates an image, such as a dental image, on a display monitor. An "operator instruction" or "viewer instruction" is obtained from explicit commands entered by the viewer, such as by clicking a button on a camera or by using a computer mouse or by touch screen or keyboard entry.

The term "highlighting" for a displayed feature has its conventional meaning as is understood to those skilled in the information and image display arts. In general, highlighting uses some form of localized display enhancement to attract the attention of the viewer. Highlighting a portion of an image, such as an individual tooth or a set of teeth or other structure(s) can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

An image is displayed according to image data that can be acquired by a camera or other device, wherein the image data represents the image as an ordered arrangement of pixels. Image content may be displayed directly from acquired image data or may be further processed, such as to combine image data from different sources or to highlight various features of tooth anatomy represented by the image data, for example. As used in the context of the present disclosure, the terms "image" and "image data" are generally synonymous.

The term "at least one of" is used to mean one or more of the listed items can be selected. The term "about" indicates that the value listed can be somewhat altered, as long as the alteration does not result in nonconformance of the process or structure to the illustrated embodiment. The term "exemplary" indicates that a particular description or instance is used by way of example, rather than implying that it is an ideal.

The described method includes calculation steps. Those skilled in the art will recognize that these calculation steps may be performed by data processing hardware that is provided with instructions for image data manipulation and display. Because such image manipulation systems are well known, the present description is directed more particularly to algorithms and systems that execute the method of the present invention. Other aspects of such algorithms and systems, and data processing hardware and/or software for producing and otherwise processing the image signals may be selected from such systems, algorithms, components and elements known in the art. Given the description as set forth in the following specification, software implementation lies within the ordinary skill of those versed in the programming arts.

The stored instructions of such a software program may be stored in a computer readable storage medium, which may comprise, for example: magnetic storage media such as a magnetic disk or magnetic tape; optical storage media such as an optical disc, optical tape, or machine readable bar code; solid state electronic storage devices such as random access memory (RAM), or read only memory (ROM); or any other physical device or medium employed to store a computer program. Using such software, the present invention can be utilized on a data processing hardware apparatus, such as a computer system or personal computer, or on an embedded system that employs a dedicated data processing component, such as a digital signal processing chip.

In this disclosure, the word "intensity" is used to refer to light level, and is also broadly used to refer to the value of a pixel in a digital image.

Fluoresced light from teeth is generally in a red or green spectral band. The green spectral band is in the approximate range from 500-550 nm. Red spectral content is in the approximate range above 600 nm, such as between about 620-700 nm.

As noted in the preceding background section, it is known that fluorescence can be used to detect dental caries using either of two characteristic responses: First, excitation by a light source of a blue bandwidth causes healthy tooth tissue to fluoresce in the green spectral band. Tooth material that has been damaged may fluoresce at a lower intensity or may not fluoresce perceptibly. Secondly, excitation by a blue or red light source can cause bacterial by-products, such as those indicating caries, to fluoresce in the red spectral band. Some existing caries detection systems use fluorescence of either type.

In order for an understanding of how light is used in the present invention, it is important to give more precise definition to the terms "reflectance" and "back-scattering" as they are used in biomedical applications in general and, more particularly, in the method and apparatus of the present invention. In broadest optical terminology, reflectance generally denotes the sum total of both specular reflectance and scattered reflectance. (Specular reflection is that component of the excitation light that is reflected by the tooth surface at the same angle as the incident angle.) In many biomedical applications, however, as in the dental application of the present invention, the specular component of reflectance is of no interest and is, instead, generally detrimental to obtaining an image or measurement from a sample. The component of reflectance that is of interest for the present application is from back-scattered visible light only. Specular reflectance is blocked or otherwise removed from the imaging path. With this distinction in mind, the term "back-scattered reflectance" is used in the present application to denote the component of reflectance that is of interest. "Back-scattered reflectance" is defined as that component of the excitation light that is elastically back-scattered over a wide range of angles by the illuminated tooth structure. "Reflectance image" data, as this term is used in the present invention, refers to image data obtained from back-scattered reflectance only, since specular reflectance is blocked or kept to a minimum. In the scientific literature, back-scattered reflectance may also be referred to as back-reflectance or simply as back-scattering. Back-scattered reflectance is in the visible spectrum (approximately 390-700 nm) at the same wavelength as the excitation light.

It has been shown that light scattering properties differ between healthy and carious dental regions. In particular, reflectance of light from the illuminated area can be at measurably different levels for normal versus carious areas. This change in reflectance, taken alone, may not be sufficiently pronounced to be of diagnostic value when considered by itself, since this effect is very slight, although detectable. For more advanced stages of caries, for example, back-scattered reflectance may be less effective an indicator than at earlier stages.

The schematic block diagram of FIG. 1 shows a dental imaging apparatus 10 for detection of caries and other tooth conditions according to an embodiment of the present invention. An intra-oral camera 30 is used for imaging tooth 20, providing the different illumination sources needed for both reflectance and fluorescence imaging, with appropriate spectral filters and other optics, detector components, and other elements. Camera 30 components for a camera that obtains both reflectance and fluorescence images are described, for example, in commonly assigned U.S. Pat. No. 7,596,253 entitled "Method and Apparatus for Detection of Caries" to Wong et al. The Wong et al. '253 patent describes a FIRE (Fluorescence Imaging with Reflective Enhancement) method that combines reflectance image data with a portion of the fluorescent image data content. Similar types of camera devices are familiar to those skilled in the dental imaging arts. Camera 30 provides image data to an external processor 40 over a transmission link 32, which may be a wired or wireless link. Processor 40 has an associated display 42 for display of the acquired and processed images. An operator interface device 44, such as a keyboard with a mouse or other pointer or touch screen, allows entry of instructions for camera 30 operation. Optionally, one or more operator controls 58 are provided on the camera 30 handset.

Embodiments of the present invention utilize fluorescence response in at least two different spectral bands. FIG. 2A shows information that is provided from fluorescence in the green spectral band. Excitation light 50 of blue and near UV wavelengths (nominally near or below about 400 nm according to an embodiment of the present invention) is directed toward tooth 20 with an outer enamel layer 22 and inner dentine 24. Fluoresced light 52 of green wavelengths, approximately in the range from 500-550 nm, is detected from portions of the tooth 20 having normal mineral content, not exhibiting perceptible damage from decay. In the representation shown in FIG. 2A, a demineralized area 26 is more opaque than healthy enamel and tends to block the incident excitation light 50 as well as to block back-scattered fluoresced light from surrounding enamel. This effect is used by the FIRE method described in the Wong et al '253 patent, wherein the fluorescence green channel data is combined with reflectance image data to heighten the contrast of caries regions.

Figure 2B:
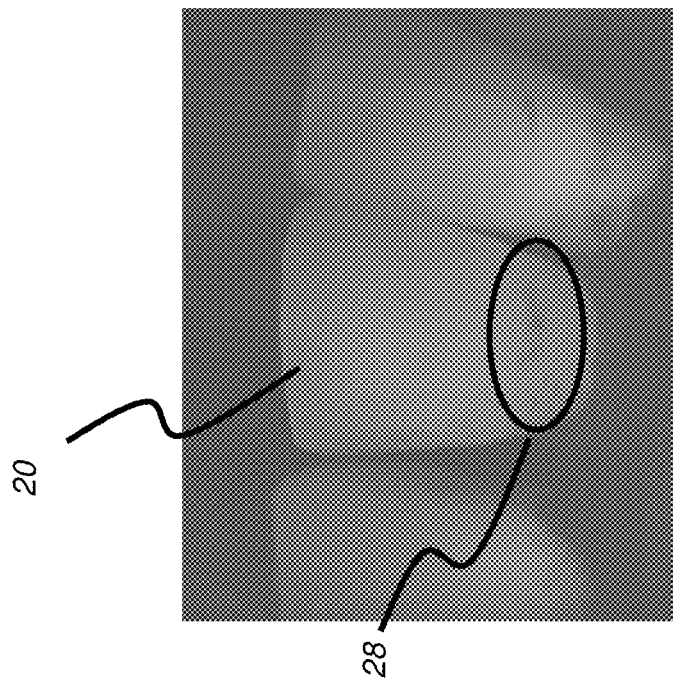
FIG. 2B is an image that shows an advanced caries condition detected according to an embodiment of the present invention.
Figure 2A:
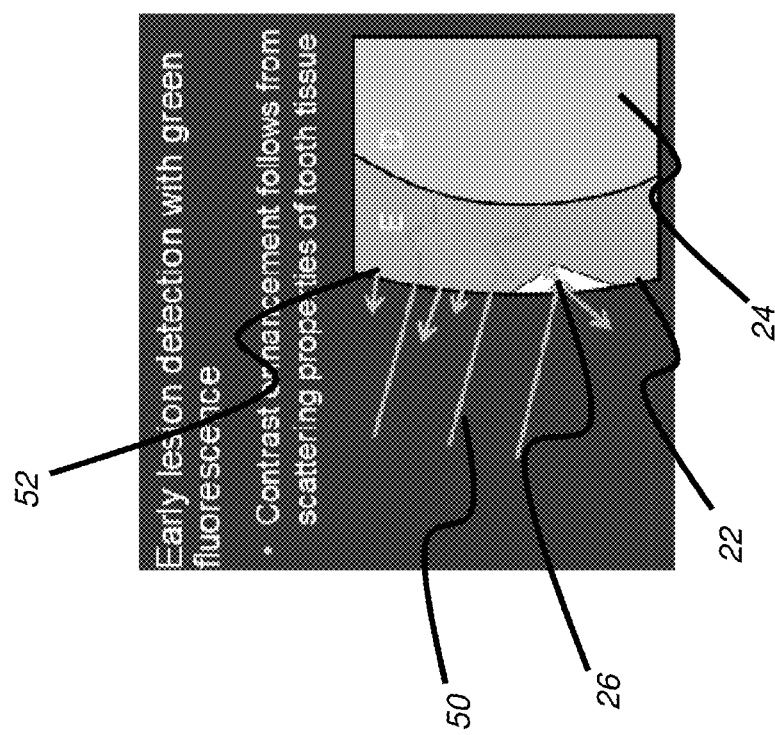
FIG. 2A is a schematic diagram that shows the activity of fluoresced green light for caries detection.

FIG. 2B shows an early caries condition detected for tooth 20 using the FIRE method, according to an embodiment of the present invention. An area 28, circled in FIG. 2B, shows suspected caries.

The fluoresced red light has different significance, indicating the presence of bacterial metabolic products. Bacteria that typically cause a caries lesion, plaque, or tartar typically generate by-products that fluoresce in the red spectrum, above about 600 nm. FIG. 3A shows the behavior of fluoresced red light 53 for caries detection. Here, a caries lesion 54 has significant bacterial activity, as evidenced by the emission of perceptible amounts of fluoresced light 53 in the red spectral region in response to excitation light 50. With proper filtering of the fluorescent light, this red wavelength emission indicates an active lesion 54, as circled in FIG. 3B.

Embodiments of the present disclosure take advantage of both reflectance and fluorescence image data. Each type of image data has useful information: Image processing of reflectance image data obtains morphology, spatial, and shape information. Image processing of fluorescence image data obtains color and opacity information that is helpful for detecting conditions such as cavities or plaque.

Figure 4:
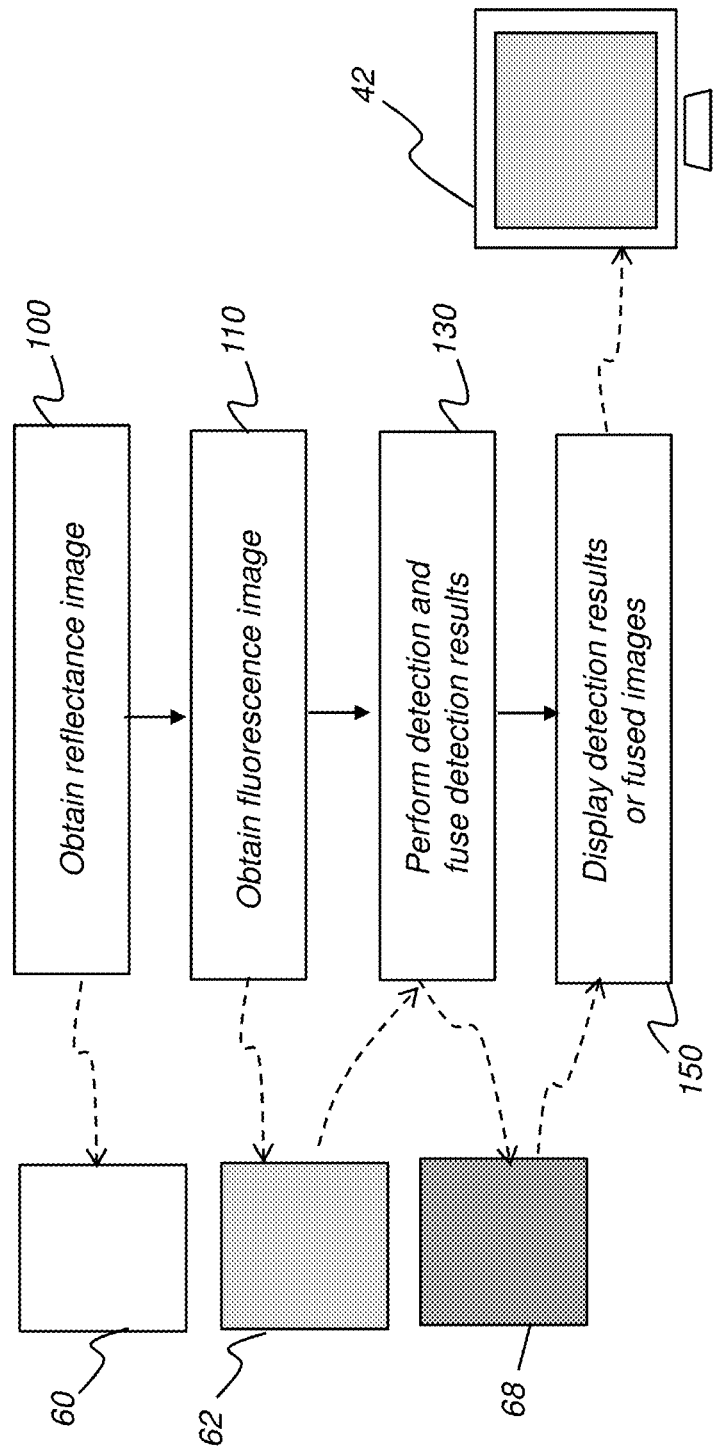
FIG. 4 is a logic flow diagram that shows the progression of data generation for image display according to an embodiment of the present invention.

FIG. 4 is a logic flow diagram that shows the progression of data acquisition and generation for image display according to an embodiment of the present disclosure. In an image acquisition step 100, a reflectance image 60 is obtained from camera 30. In an image acquisition step 110, a fluorescence image 62 is obtained from camera 30, in register with the reflectance image 60. Steps 100 and 110 are generally sequential and may be simultaneous.

A detection step 130 carries out the method described below to automatically detect the target condition on the teeth; the detection results are fused or combined with corresponding reflectance or fluorescence image content for improved visualization and to provide one or more images 68 that help to show various detection results. A display step 150 displays the detection results. Display step 150 shows the identified condition as caries, plaque, or calculus. According to an embodiment of the present disclosure, where caries is identified, display step 150 also indicates the relative level of severity of the identified caries condition as incipient caries, advanced caries, or dentinal caries. The severity of the caries condition is identified by a text annotation that displays with the processed image.

Figure 5:
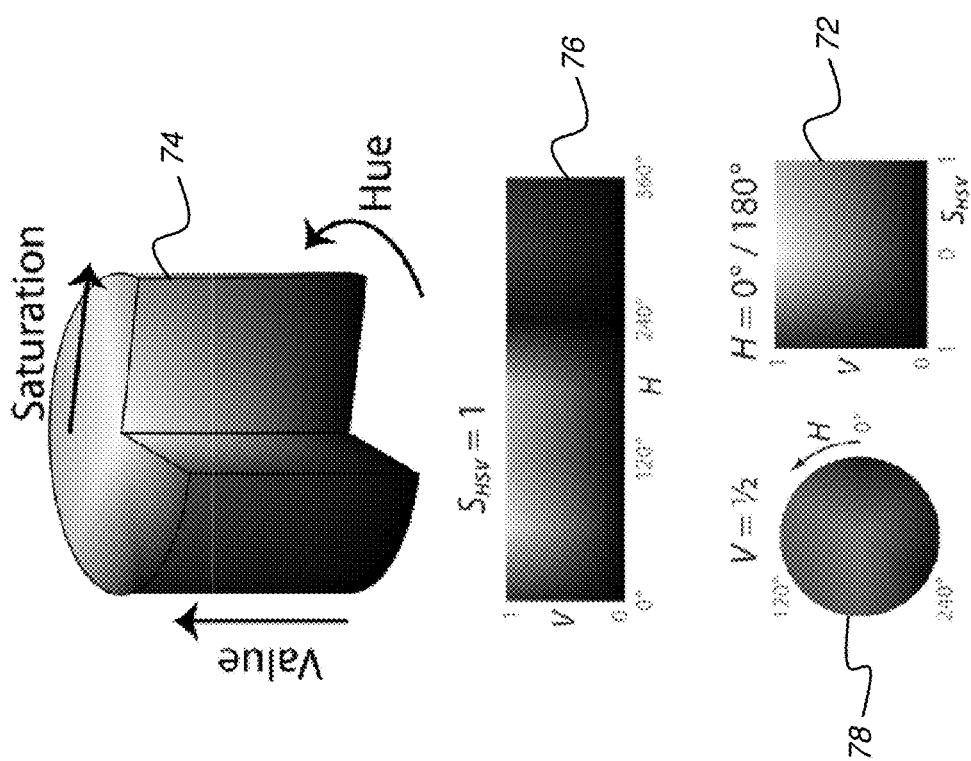
FIG. 5 is a diagram that shows the overall arrangement of color space using the hue-saturation-value (HSV) model.

Camera 30 (FIG. 1) typically captures color images in a tristimulus Red-Green-Blue (RGB) representation, using a conventional type of CMOS (Complementary Metal Oxide Semiconductor) or CCD (Charge-Coupled Device) image sensor device. However, according to an aspect of the present disclosure, the color image data is converted from tristimulus RGB to a polar-coordinate color model for simplifying calculation and conversion. The diagram of FIG. 5 shows the overall arrangement of color space using the hue-saturation-value (HSV) model. In polar-coordinate HSV color representation, Hue is provided with an angular coordinate. Coordinate position relative to a central axis represents color Value. Saturation is represented by coordinate distance from the central Value axis. Three-dimensional HSV coordinates are represented in a perspective view 74. A 2-D view 76 shows Hue and Value coordinate space. A circular view 78 shows Hue angular relationship at a halfway point along the Value axis. A 2-D view 72 shows a slice taken through perspective view 74 to show Saturation with respect to Value. Transformation of the RGB data from the camera detector to HSV data uses algorithmic methods and calculations familiar to those skilled in the color imaging arts.

Image Preprocessing Step 200

Figure 6:
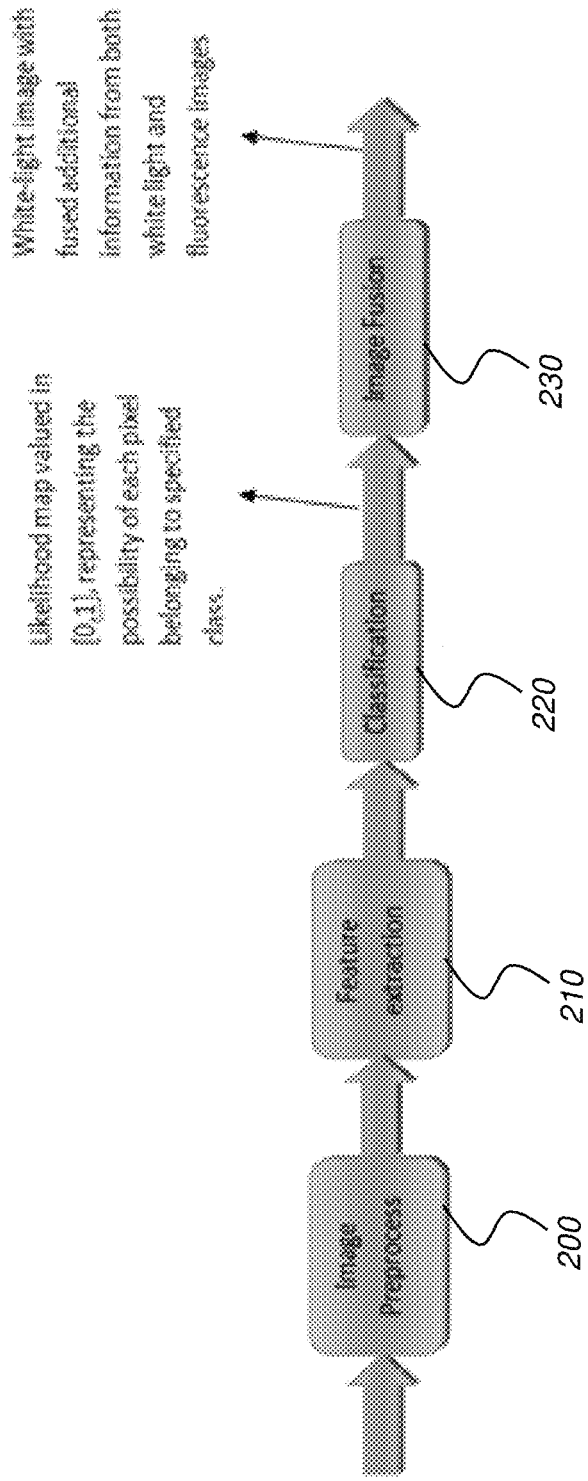
FIG. 6 is a process flow diagram that shows steps for processing acquired image data for caries detection in still-image mode.

The process flow diagram of FIG. 6 shows steps for processing acquired image data for detection of targeted conditions. An image preprocess step 200 aligns the acquired reflectance (white light) image 60 and fluorescence image 62 (FIG. 4) in register. Any of a number of alignment algorithms can be used for this function; according to an embodiment of the present disclosure, a multi-modal image registration technique for aligning reflectance and fluorescence images is used.

According to an embodiment of the present disclosure, multi-modal image registration is executed in the following sequence:

1) Taking, as input, the reflectance image, Iref, and fluorescence image, Iflu, use down-sampling to generate two corresponding image pyramids of L levels: Pyr_ref and Pyr_flu. Each image pyramid has RGB channels of image data with different resolutions, including higher-level and lower-level resolution. For example, where value L is 3, successively down-sampling the image by half yields image pyramids of 3 levels in which resolution of the higher level is only half of that of the lower level.

Reset a displacement field, Dis_i, to zero.

2) For value i from L to 1, iteratively perform the following processing:

2.1) Extract green channels of the fluorescence image from Pyr_flu at current level i, namely Iflu_i, and extract the original green channel of the reflectance image, namely Iref_i_o, from Pyr_ref at i. Use Dis_i and bi-linear interpolation to obtain a transformed green channel of the reflectance image, namely Iref_i;

2.2) Divide each of channel images Iref_i and Iflu_i into equal-sized blocks;

2.3) For each block j in Iref_i, namely B_ref_i_j, find a corresponding block k in Iflu_i, namely B_flu_i_k, that appears to have the highest level of similar content, using methods for similarity assessment familiar to those skilled in the image processing arts. Analysis for similar content can provide a mutual information value, wherein mutual information is a measure of similarity between images captured from different sources. Calculate a displacement vector between B_ref_i_j and B_flu_i_k, namely Dis_i_j_k. The combination of Dis_i_j_k vectors for a block compose a displacement field for current level i, namely Dis_i;

2.4) Use a Least Trimmed Squares (LTS) Method, or other similar regression process, and Dis_i to calculate a transformation for level i, namely T_i;

2.5) Convert T_i to a displacement vector for each block B_ref_i_j in order to obtain a local transformation field for level i, namely LT_i.

2.6) Combine LT_i and the current displacement field Dis_i to get the updated displacement field for the next level, re-named Dis_i_l;

2.7) Update Dis_i_l into Dis_i (Dis_i=Dis_i_l);

2.8) Decrease i by 1; if i is nonzero, loop back to step 2.1); otherwise, continue to step 3).

3) Use final Dis_i and the Least Trimmed Squares Method or other appropriate regression technique to calculate the final affine transformation, T_final.

4) For the original reflectance image Iref, using T_final and nearest neighbor interpolation, generate the registered reflectance image, namely Iref_reg, including RGB channels of Iref_reg.

Following this multi-modal image registration, subsequent operations are then performed on Iref_reg. Reflectance images can now be provided as registered images Iref_reg.

The above multi-modal image registration steps are carried out to transform the reflectance image for registering to the fluorescence image. Alternately, similar steps can be carried out to transform the fluorescence image for registering to the reflectance image.

In further preprocessing of the obtained images, RGB values are normalized to compensate for variation in illumination levels. One or more additional images are also prepared for reference in subsequent processing. For example, an RG ratio image may be generated, in which each pixel has a value proportional to the ratio of red (R) to green (G) values in the initial RGB value assignment from the imaging detector of camera 30. In addition, the tooth Region of Interest (ROI) is also extracted using any of a number of well known segmentation techniques. As part of this segmentation, the tooth 20 is defined apart from background image content in both the reflectance and fluorescence images.

As part of image preprocess step 200, the fluorescence image is processed to provide image content from both green and red spectral bands.

Feature Extraction Step 210

Continuing with the FIG. 6 sequence, a feature extraction step 210 transforms the color data for image pixels from RGB to HSV representation, as described previously with respect to FIG. 5. For each pixel of the segmented ROI of the acquired image, a joint feature vector is generated. The joint feature vector includes values representative of both the tristimulus RGB reflectance image value (not yet transformed to HSV form) and the fluorescence value (transformed to polar HSV form).

Feature vectors are multivalued or n-dimensional data structures that characterize particular features of an image and are familiar to those skilled in pattern recognition and image analysis. According to embodiments of the present disclosure, the construction of a particular feature vector can vary depending on the targeted condition for detection. Subsequent description outlines feature vector composition for detection of incipient caries, advanced caries, plaque, and dentinal caries conditions. Each of these feature vectors has the parameters needed for assessing the tooth with respect to a particular condition. According to embodiments of the present disclosure, successive feature vectors are automatically formed and used to assess the condition of the patient's teeth. Alternately, a single multivalued feature vector is generated for each tooth; processing for a particular condition then uses only a subset of the components or parameters that form the feature vector.

Feature Vector Description—Incipient Caries

To process the acquired image data for detection of incipient caries, feature vectors are constructed with a number of components. A first component is extracted from the reflectance image using mathematical morphology methods including top-hat and adaptive reconstruction. A second component is extracted from the fluorescence image with Hue and Saturation components.

Relative to the first component, a region of incipient caries in a reflectance image, Iref, appears brighter than neighboring sound regions, and the component indicative of caries corresponds to the contrast. The method for extracting contrast and for subsequent caries quantification from the reflectance image depends on which type of tooth surfaces are captured:

(i) For buccal and lingual surfaces, an adaptive reconstruction with Iref as mask and Iref-1 as marker is performed. Various morphological reconstruction techniques process a marker image based on the characteristics of another image, called the mask. The highpoints, or peaks, in the marker image specify where processing begins. Morphological reconstruction performs repeated dilations of the marker image until the contour of the marker image fits under the mask image. The dilations and processing continue until the image values stop changing. In this way, the peaks in the marker image "spread out", or dilate.

The adaptive reconstruction is executed twice, using vertical and horizontal line-shaped structuring elements. The two results are then combined to form a binary image with TRUE and FALSE pixels, Imax_reg. Four top-hat transform operations are performed using a rectangular rotation with four orientations, in order to acquire an image Ismth_reg. Using TRUE pixels in the binary image Imax_reg as starting pixels, dilations are performed iteratively until TRUE pixels in image Ismth_reg are reached by iterative dilations. For each starting pixel, the intensity of the starting pixel is subtracted by the minimum in the dilated region, and differences are stored so as to acquire a Dynamic Range Image, Hx.

Using Iref-Hx as marker and Iref as mask, four geodesic reconstructions are performed with four structuring elements constructed by rotating a line to four orientations. The four results are then combined to form the reconstructed image, Iref_rec. The final contrast Icont is the difference, i.e. Iref-Iref_rec.

(ii) For occlusal surfaces, top-hat transform operations are performed using disk-shape structuring elements with sizes correlated with areas of teeth. The final contrast Icont is formed from the top-hat transform results.

As noted previously, a second component of the feature vector for incipient caries is extracted from Hue and Saturation data in the fluorescence image. In the fluorescence image, incipient caries has a darker green appearance than does healthy tooth material. The component of interest for incipient caries is most clearly perceptible in the green range and is calculated using the following sequence:

1) Transform fluorescence image from RGB to HSV color space so as to acquire these values for each pixel (x, y):
H image, Ih,
S image, Is,
V image, Iv,
with pixel values of all 3 images in range [0,1].

2) For each pixel (x,y) in Ih, calculate a mapped value, $I_m(x,y)$ by $$I_{mx}(x, y) = \begin{cases} 1/\{1 + \exp[-\theta * (I_h(x, y) + \beta) + \eta]\}, \text{ if } (I_h(x, y) > \alpha) \\ 1/\{1 + \exp[-\theta * (-I_h(x, y) + \varphi) + \eta]\}, \text{ if } (I_h(x, y) \leq \alpha) \end{cases}$$

wherein value $\theta$ is a parameter that relates to the rising degree of the mapping function shape;
value $\alpha$ corresponds to the hue angle;
value $\beta$ corresponds to the hue value upper range, which can control the shape of the mapping function;
value $\eta$ corresponds to a parameter controlling the shape of the mapping function;
value $\varphi$ corresponds to the hue value lower range, which can control the shape of the mapping function;
Here, threshold $\alpha$ corresponds to a standard green hue. For example, $\theta=-51$, $\beta=0.22$, $\eta=20$, $\varphi=0.28$, $\alpha=0.3333$ 3) Then combine Imx and Is values in order to acquire the image fluorescence component Iz using $$Iz(x,y)=1/\{1+\exp[-14*Imx(x,y)*Is(x,y)+6)]\}.$$

The likelihood mapping for incipient caries, Ilkl_ic, is representative of Fluorescence Loss which is calculated using the difference between interpolated and actual fluorescence image values. Interpolation uses the boundary or threshold value that is indicative of incipient caries, detected by a later classification method.

Feature Vector Description—Advanced Caries

To process the acquired image data for detection of advanced caries, feature vectors are constructed in an alternative manner. One component is extracted from the reflectance image using mathematical morphology methods including bottom-hat processing on the green channel and top-hat processing on the R:G ratio image. A second component of the feature vector for advanced caries candidates is extracted from fluorescent image 66 with Hue and Saturation components.

Areas of advanced caries include cavities that clearly break through the enamel. In reflectance images, an area having more advanced caries appears darker than healthy tooth material. The feature vector for advanced caries detection is formed with components from both the reflectance image and the HSV image from fluorescence.

For the reflectance image component, a distance transform is performed within the segmented tooth Region Of Interest, Iroi that was obtained from image preprocess step 200. This generates a distance map, Idist. A maximum value, Dmax_rgn, in Idist is regarded as a measurement of the tooth area in a region of interest Iroi. Using a disk-shaped structural element whose size depends on Dmax_rgn, a bottom-hat operation is performed. The component of the reflectance image that is used is the result of the bottom-hat operation.

In the fluorescence image, the metabolic by-product of carious bacteria is red in appearance. The component of the feature vector can be calculated as follows:

1) Transform fluorescence image from RGB to HSV color space so as to acquire these values for each pixel (x, y):
   H image, Ih,
   S image, Is,
   V image, Iv,
   and pixel values of all 3 images in range [0,1].

2) For each pixel (x,y) in H image Ih, calculate a mapped value, Imx(x,y) by:

$$Imx(x,y)=1-2*Min(Ih(x,y),1-Ih(x,y)).$$

3) Combine Imx and S image Is to acquire the image Iz using:

$$Iz(x,y)=1/\{1\pm\exp[-14*Imx(x,y)*Is(x,y)+6)]\}.$$

4) After performing a smoothing operation with a Gaussian filter, execute a tophat operation to enhance the significance of features.

The result of the tophat operation, Ilkl_ac, is used as the component corresponding to fluorescence images. Ilkl_ac is also called the likelihood mapping for advanced caries.

Feature Vector Description—Plaque

In the reflectance image, plaque and calculus have white or yellowish appearance. Thus, plaque and calculus generally correspond to contrast in the reflectance image. The reflectance component for this feature vector is calculated as described following.

For the reflectance image component, a distance transform is performed within the segmented tooth Region Of Interest, Iroi. This generates a distance map, Idist. A maximum value, Dmax_rgn, in Idist is regarded as a measurement of the tooth area in region of interest Iroi. Using a disk-shaped structural element whose size depends on Dmax_rgn, a top-hat operation is performed to obtain a value Itop. Meanwhile, a stripe-shaped region, Igin, along the gingival-teeth boundary, is also segmented in Iroi, and pixels of Igin in the stripe-shaped regions are set to 1; meanwhile, pixels outside the regions are set to 0. Finally, the reflectance component for the feature vector is acquired by multiplying Igin with Itop.

In the fluorescence image, plaque & calculus have an orange/red appearance. The component of interest corresponds to the red value and can be calculated using the same method described previously for calculation of the fluorescence feature vector component for advanced caries. The feature component is also termed a likelihood mapping for plaque & calculus, Ilkl_pc.

Feature Vector Description—Dentinal Caries

Dentinal caries can be detected by the imaging apparatus after cavities in enamel are opened during treatment. Healthy dentine has a bright green appearance in the fluorescence image.

Reflectance images show no significant feature for dentine caries during treatment. Thus, the feature vector for dentine is simply a scalar and uses only fluorescence information; data from reflectance images are not used for dentinal caries detection.

The feature vector for dentinal caries can be calculated as follows:

1) Transform the fluorescence image from RGB to HSV color space to acquire these values for each pixel (x, y):
   H image, Ih,
   S image, Is,
   V image, Iv,
   and pixel values of all 3 images in range [0,1].

2) For each pixel (x,y) in Ih, calculate a mapped value, Imx(x,y) by:

$$I_{mx}(x,y) = \begin{cases} 0, & \text{if } [(I_h(x,y) > H_{lo}) \text{ AND } (I_h(x,y) < H_{hi})] \\ 1 - \frac{I_h(x,y)}{H_{lo}}, & \text{if } [I_h(x,y) \le H_{lo}] \\ \frac{I_h(x,y) - H_{hi}}{1 - H_{hi}}, & \text{if } [I_h(x,y) \ge H_{hi}] \end{cases},$$

Hhl and Hlo are set corresponding to hue angle values for healthy dentine in HSV color space, for example, 0.38 and 0.30.

3) Then combine Imx and Is to acquire the image Ilkl_dc using $$Ilkl\_dc(x,y)=1/\{1+\exp[-7*Imx(x,y)*Is(x,y)+3)]\}-0.05.$$

Ilkl_dc is used as a feature mapping or as likelihood mapping for dentine caries.

As one useful by-product of feature extraction step 210 (FIG. 6), a likelihood value is calculated for each pixel, expressing a risk degree of infection for tooth structure that is associated with the pixel Likelihood values calculation is varied according to the detected infection condition (incipient caries, advanced caries, plaque, and dentinal caries), using the calculation processes described previously. A 2-D mapping of likelihood values ranging in [0,1] is then used to generate a likelihood mapping that indicates relative risk levels corresponding to overall levels of bacterial activity.

Classification Step 220

Continuing with the FIG. 6 sequence, a classification step 220 generates and processes feature vectors for the tooth image data. According to an embodiment of the present disclosure, all four of the feature vectors listed earlier are generated for pixels in the image data. According to an alternate embodiment of the present disclosure, fewer than four are used; only specific feature vectors are generated for a particular set of image data, based on operator/practitioner selection or based on analysis of the image data that has been acquired for the tooth.

Processing takes the feature vectors and the tooth image data as input and processes the image data using these feature vectors with one or more trained classifiers in order to distinguish healthy tooth and dentine from infected tooth and dentine. The trained classifiers can be 1-dimensional (1-D) or two-dimensional (2-D) data structures and can include software designed with neural network response, conditioned to provide decision results according to previous interaction with a training set of conditions and interaction with ongoing conditions encountered in normal use. Neural network and training software in general, including the use of trained classifiers, are known to those skilled in the software design arts. As a result of classification step 220, sound and infected tissue are classified separately and distinguished from each other in the image data. Thus, for example, it is straightforward to highlight only the infected portion of the tissue for display. Moreover, different levels of caries infection can be distinguished from each other, so that the practitioner can selectively view results that are categorized according to severity of a patient's condition, for example.

Linear classifiers are proposed for various classifications in step 220. For advanced caries, incipient caries, and plaque and calculus detection, 2-D joint feature vectors are used. Accordingly, 2-D linear classifiers are used for these vectors as follows:

1) For each pixel (x,y), calculate G(x,y), and $G(x, y)=A^T \cdot \tilde{C}(x, y)$.

When G(x,y)>0, the pixel(x,y) is classified as healthy tissue; else the pixel(x,y) is classified as infected tissue. For this classification, $$A = \begin{bmatrix} 1 \\ a \\ b \end{bmatrix}, \text{ and } \tilde{C}(x, y) = \begin{bmatrix} C_{REFL}(x, y) \\ C_{FLUO}(x, y) \\ 1 \end{bmatrix}.$$

Variables $C_{REFL}(x, y)$ and $C_{FLUO}(x, y)$ are feature components extracted from reflectance and fluorescence images, respectively. Using training samples including healthy tissues and infected tissues and including advanced caries, incipient caries, and plaque and calculus, linear classifier A can be trained for targeted conditions, respectively.

Regarding dentinal caries, the feature is scalar or 1-dimensional; for this analysis, a threshold is trained using a training database of healthy and carious dentine.

In addition to above linear classifiers, a Gaussian Mixture Model (GMM) can also be used for the decision process with classifier software. GMMs consist of a group of weighted combined Gaussian Models shown as following: For incipient caries, advanced caries and plaque & calculus, for each pixel (x,y), there is an associated probability:

$$p(x, y) = \sum_{i}^{N} \omega_i N(\tilde{C}(x, y), \mu_i, \Sigma_i),$$

Here, $$\tilde{C}(x, y) = \begin{bmatrix} C_{REFL}(x, y) \\ C_{FLUO}(x, y) \\ 1 \end{bmatrix}$$

is a 2D feature vector as above, and $\mu_i$ is a 2D mean vector. $\Sigma_i$ is a 2×2 covariance matrix. N is the number of Gaussian models used. After the predetermined number of GMMs, processing for parameters including $\omega_i$, $\mu_i$ and $\Sigma_i$ can be trained using healthy and infected tissue data. For dentine caries, the above GMM may be simplified into 1-dimensional form. With trained GMMs, classification can be implemented using a general Bayesian classification, or simply using a threshold.

Image Fusion Step 230

Continuing with the process steps shown in FIG. 6, an image fusion step 230 provides a number of processes, including color space transformation, image enhancement, and image fusion. At the conclusion of this processing, the likelihood value for each pixel in an infected tissue region is fused or combined with the reflectance or fluorescence image. The likelihood value conditions how the tooth region displays. According to an alternate embodiment of the present disclosure, the likelihood value for the pixel determines whether or not a pixel displays according to the acquired reflectance data or according to the acquired fluorescence data related to the pixel.

Figure 7:
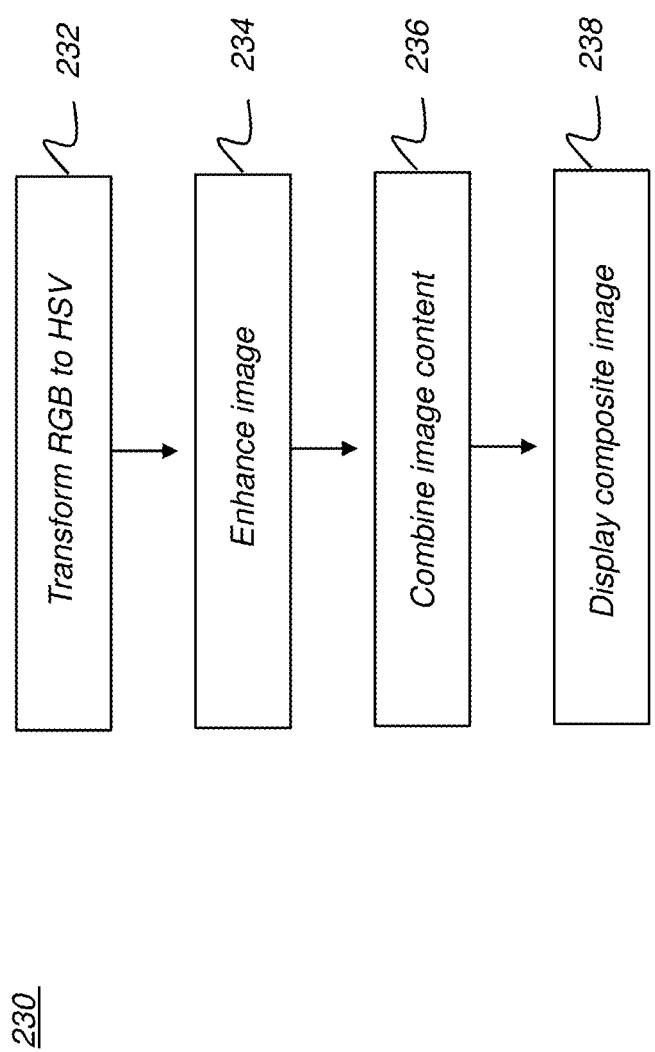
FIG. 7 is a logic flow diagram showing steps for image fusion.

The logic flow diagram of FIG. 7 shows substeps that are part of image fusion step 230. Step 230 begins with a color space transformation step 232. The reflectance image or the fluorescence image data are transformed from RGB to HSV color space. After this transformation, color components outside the detected lesion are left unchanged.

An image enhancement step 234 processes the HSV color Value (V) component of the ROI to emphasize detail. The Hue value (H) component is mapped to a specified range so that the detected lesion is more noticeable. The Saturation value (S) component is set proportional to the likelihood value, obtained as described previously, so that color saturation expresses relative risk level for affected areas.

A combination step 236 then fuses the enhanced H-S-V image content with the white light and the fluorescent image to form a composite image. Fusion means combining by substituting H-S-V enhanced pixels from the infected region for the corresponding pixels from the reflectance or fluorescence image. The operator/practitioner is given the option to display either the fluorescence or the reflectance composite image or, alternately, to display the likelihood mapping. Thus, display step 238 can display at least the composite image.

Figure 8A:
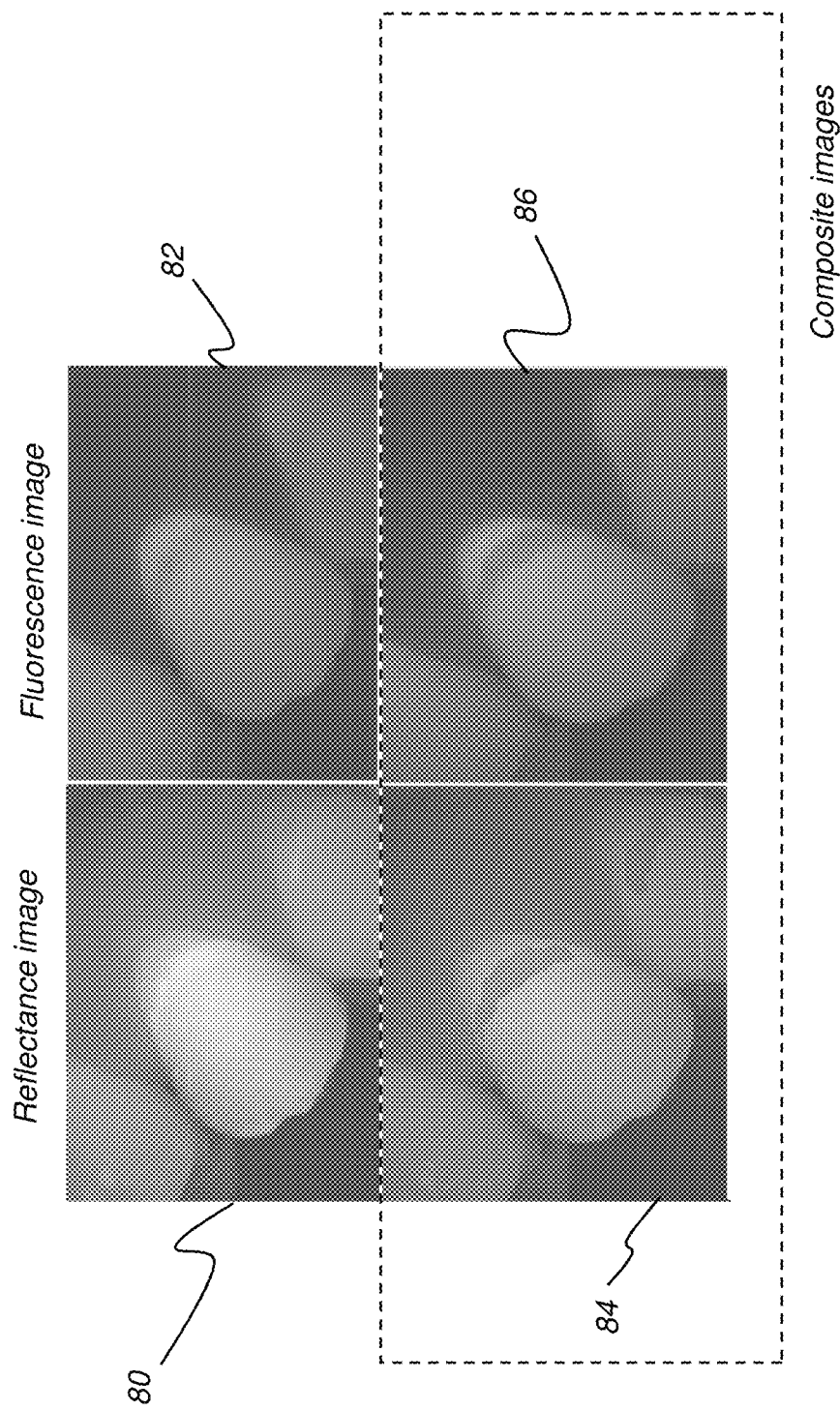
FIGS. 8A and 8B show some example images at different stages of the processing sequence described with respect to FIGS. 6 and 7.
Figure 8B:
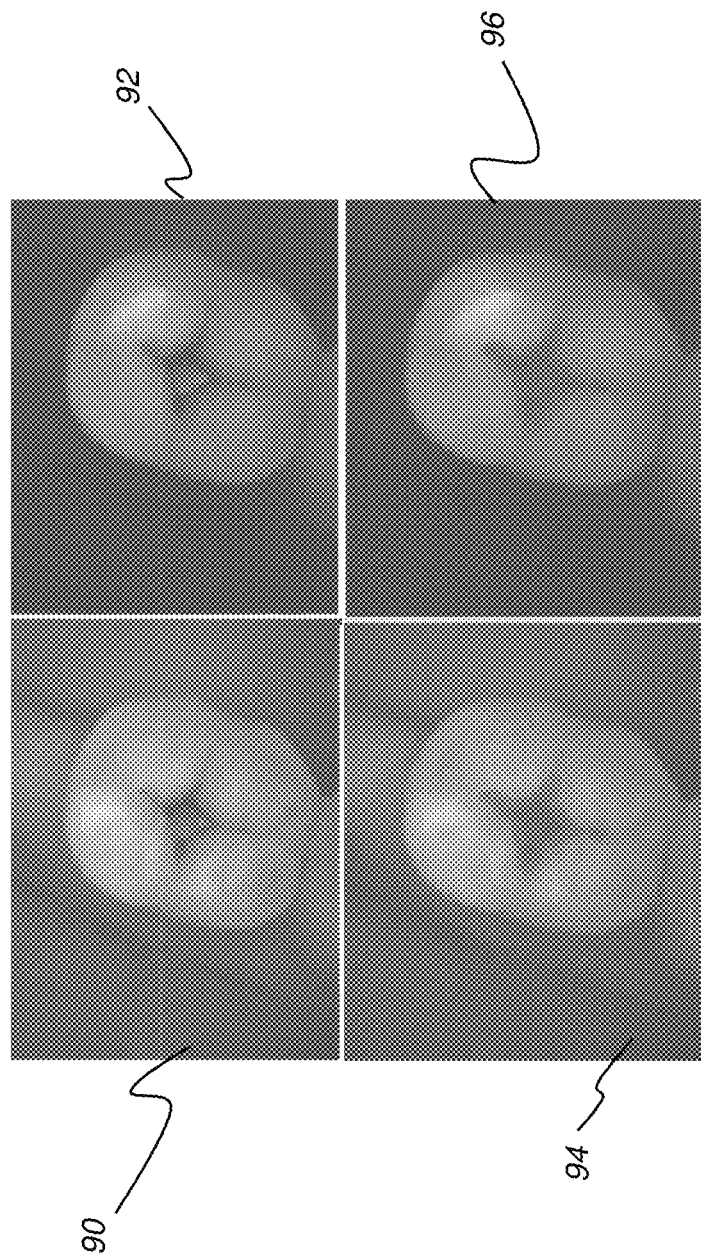

FIGS. 8A and 8B show some example images at different stages of the processing sequence described with respect to FIGS. 6 and 7 for detection of incipient caries. FIG. 8A shows an exemplary reflectance image 80 and a fluorescence image 82. Corresponding reflectance composite image 84 and the fluorescence composite image 86 are shown for this example.

Figure 8C:
FIG. 8C shows an exemplary likelihood mapping.

In FIG. 8B, a reflectance image 90 and a fluorescence image 92 are shown, with corresponding composite images 94 and 96 for detection of advanced caries. The increased value and saturation provided by this processing make the infected area highly visible against surrounding healthy tooth material. FIG. 8C shows an exemplary likelihood mapping 98.

Figure 9:
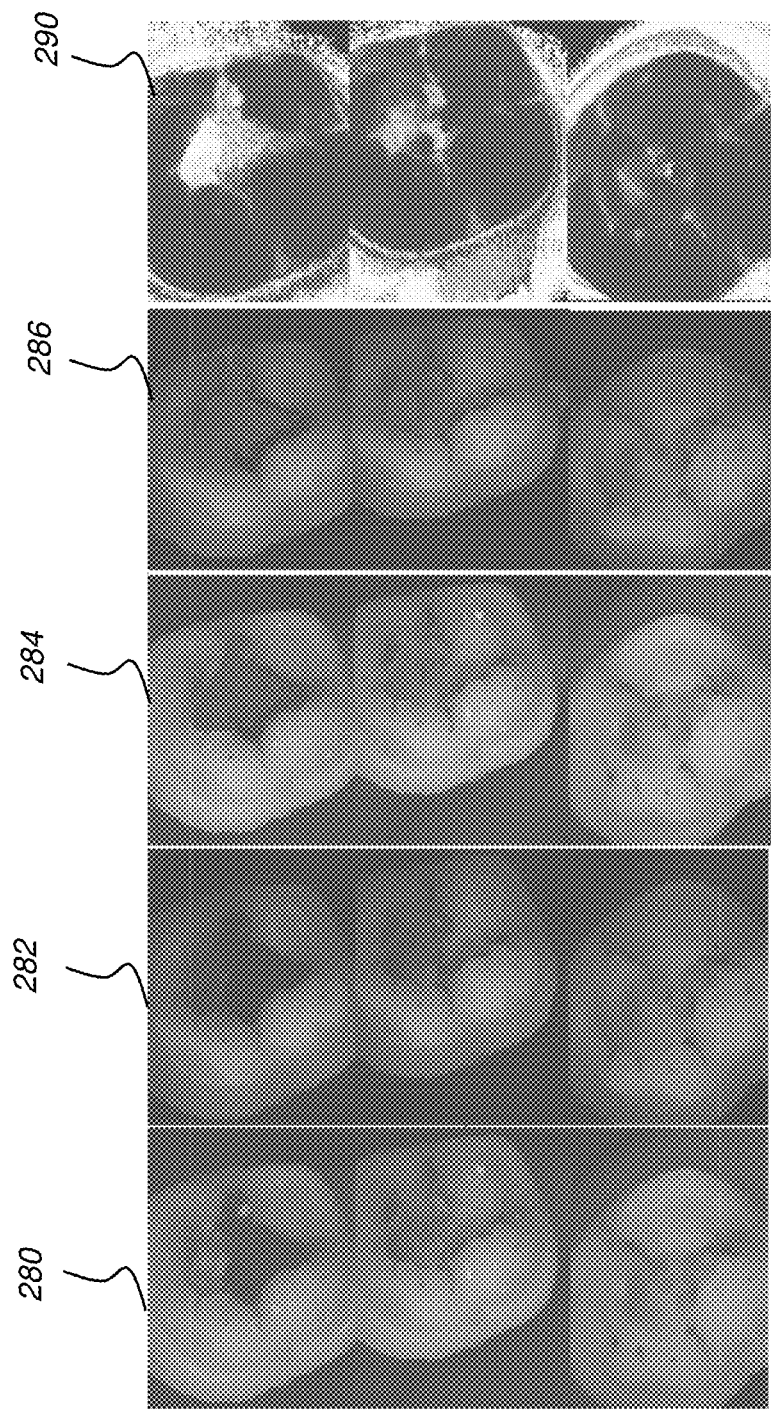
FIG. 9 shows images that illustrate the output of steps for processing acquired image data for caries detection.

FIG. 9 shows various image fusion results as well as a likelihood mapping 290 for detection of dentinal caries at progressive stages of the caries excavation process. There is a set of white light images 280; a set of fluorescence images 282, a set of fused or composite white (reflectance) light images 284, and a set of fused or composite fluorescence images 286. At the right, there is a corresponding set of likelihood mappings 290 for the tooth undergoing treatment for caries on its occlusal surface.

The first, top image in each set or column in FIG. 9 corresponds to the start of caries excavation. Successive images show the pervasive extent of the dentinal caries, as indicated by the red color in image sets 284 and 286. The last image in each set (bottom row) was captured near the end of caries excavation. This sequence shows that the dentinal caries has been almost completely removed, as indicated by the almost absence of highlight red color in final (bottom row) images of image sets 284 and 286.

Embodiments of the present disclosure also provide dental plaque detection using red fluorescence. Dental plaque is a biofilm, usually a pale yellow that develops naturally on the teeth. Like any biofilm, dental plaque is formed by colonizing bacteria trying to attach themselves to the tooth's smooth surface. Calculus or tartar is a form of hardened dental plaque. It is caused by the continual accumulation of minerals from saliva on plaque on the teeth. Its rough surface provides an ideal medium for further plaque formation, threatening the health of the gingival tissue (gums). Brushing and flossing can remove plaque from which calculus forms; however, once formed, it is too hard and firmly attached to be removed with a toothbrush.

When teeth images are captured using white-light illumination, the different lesions, in particular including incipient caries, pit and fissure caries, or plaque-calculus, appear differently. When teeth, excited by UV light, emit fluorescence that is captured by camera 30, further difference of visual features can be observed using the captured fluorescence images.

Procedures for plaque and calculus detection and display are similar to those described for caries detection. Feature vectors for plaque or calculus have multiple components. One component is extracted from the reflectance image using mathematical morphology methods including top-hat and adaptive reconstruction. Another component is extracted from the fluorescence image with Hue and Saturation components. Classification and image combination are also similar. The likelihood value for a plaque or calculus area corresponds to a color distance to red.

Figure 10:
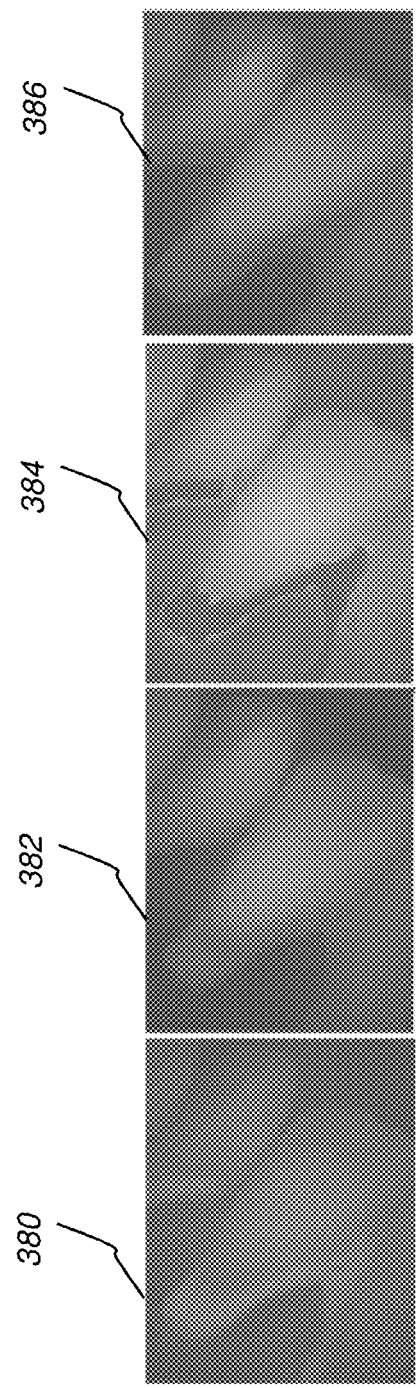
FIG. 10 shows exemplary reflectance, fluorescence, and composite images.

FIG. 10 shows a reflectance image 380 and a fluorescence image 382 for a tooth having a plaque or calculus condition. FIG. 10 also shows a composite image 384 using a reflectance image and a composite fluorescence image 386.

As has been described, methods of the present disclosure not only provide tools for assessment of a number of different conditions but, as part of this function, also generate and process a number of intermediate images in order to help detect caries at various stages, as well as plaque and calculus. It can be appreciated that the practitioner may find a particular type of image useful for assessing patient condition and may want to compare or contrast various images obtained during this processing. In order to serve this need, embodiments of the present disclosure provide an optional selection and display capability for images used during processing.

Figure 11:
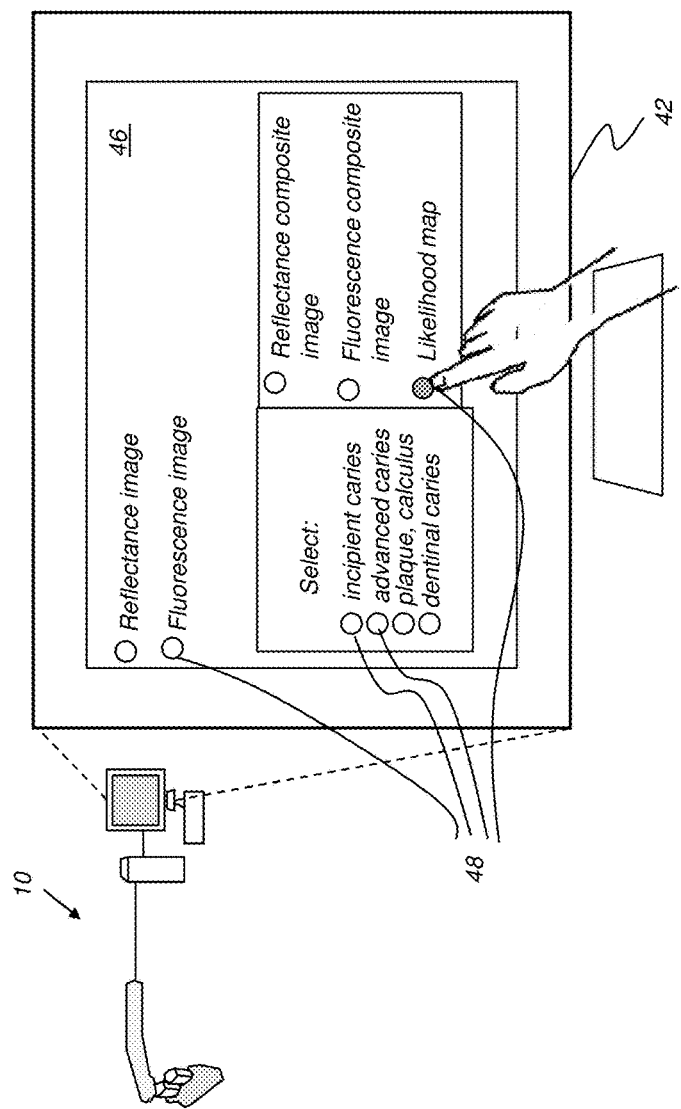
FIG. 11 shows an operator interface screen for display of various types of images generated for showing tooth condition.

FIG. 11 shows an operator interface screen 46 on display 42. Screen 46 has selections 48, such as buttons, tabs, or pull-down menu selections, that allow the practitioner or other operator to select, for display, any of the different types of images available from the system. This includes selection of the image type to display, such as reflectance or fluorescence image or likelihood mapping; This selection can also include displaying results of the analysis on the obtained images, for incipient, advanced, or dentinal caries or for plaque and calculus. Alternately, selections for displayed image type or processing results can be made by the operator using operator control 58 on the camera 30 handpiece (FIG. 1). Selections can be entered depending on examination for particular conditions of the teeth, for example. For the exemplary screen 46 that is shown, the practitioner can choose to see the original reflectance image or fluorescence image, and can specify a particular condition of interest, such as incipient or advanced caries, or plaque or dentinal caries, and corresponding images for the selected condition. In addition, the practitioner or operator can also select to view a likelihood mapping for a specified condition. It can be appreciated that any of a number of options is available for operator specification and selection of images processed by the system, including interim or intermediate images generated as described for various processes, such as for generating the feature vectors for each particular condition. According to an embodiment of the present invention, the display screen 46 can show multiple images at a time, such as showing the set of images shown in FIG. 9, for example.

Figure 12:
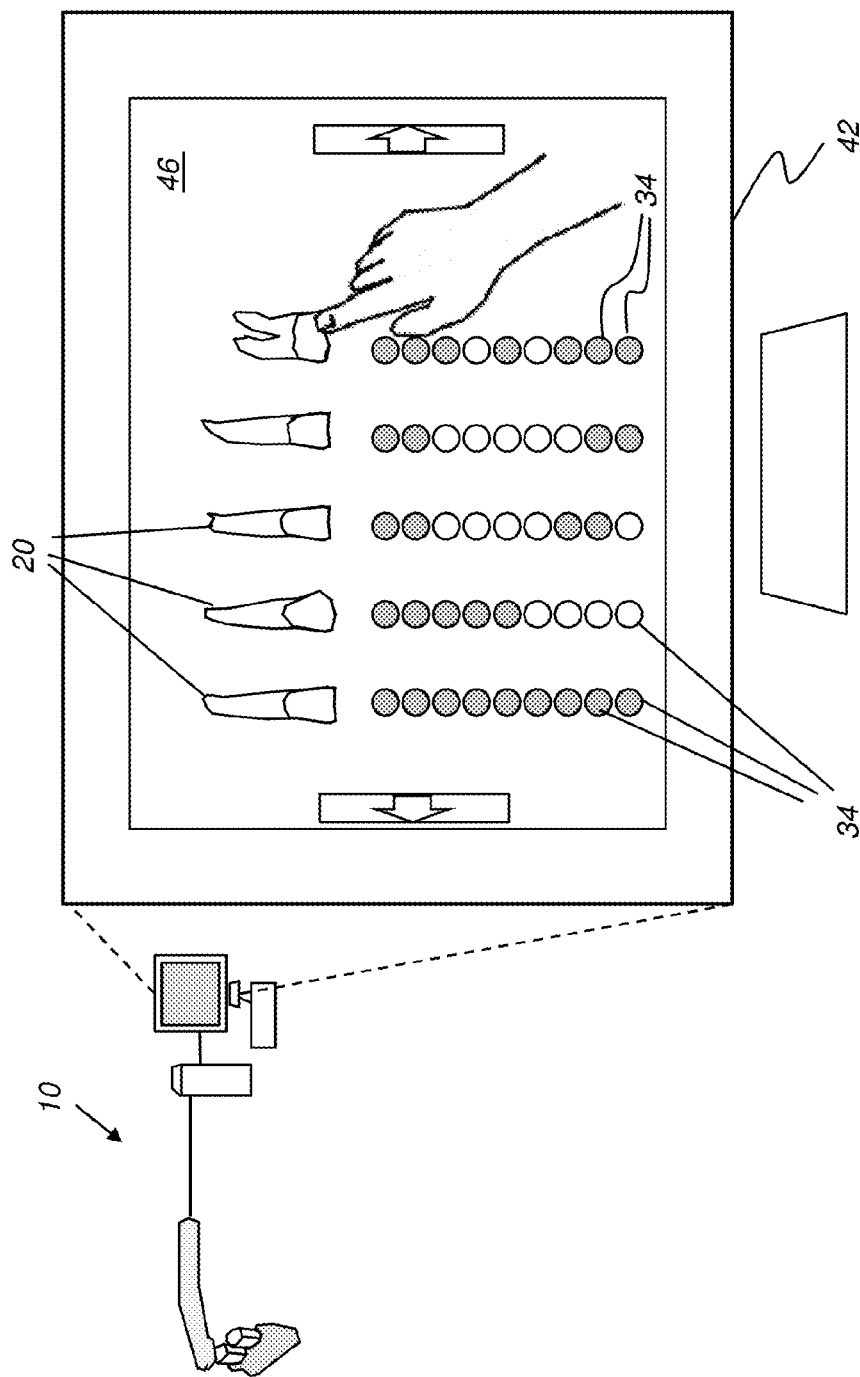
FIG. 12 shows an operator interface screen that relates the various images of the patient acquired and generated in the process described in the present disclosure to particular teeth for the patient.
Figure 13:
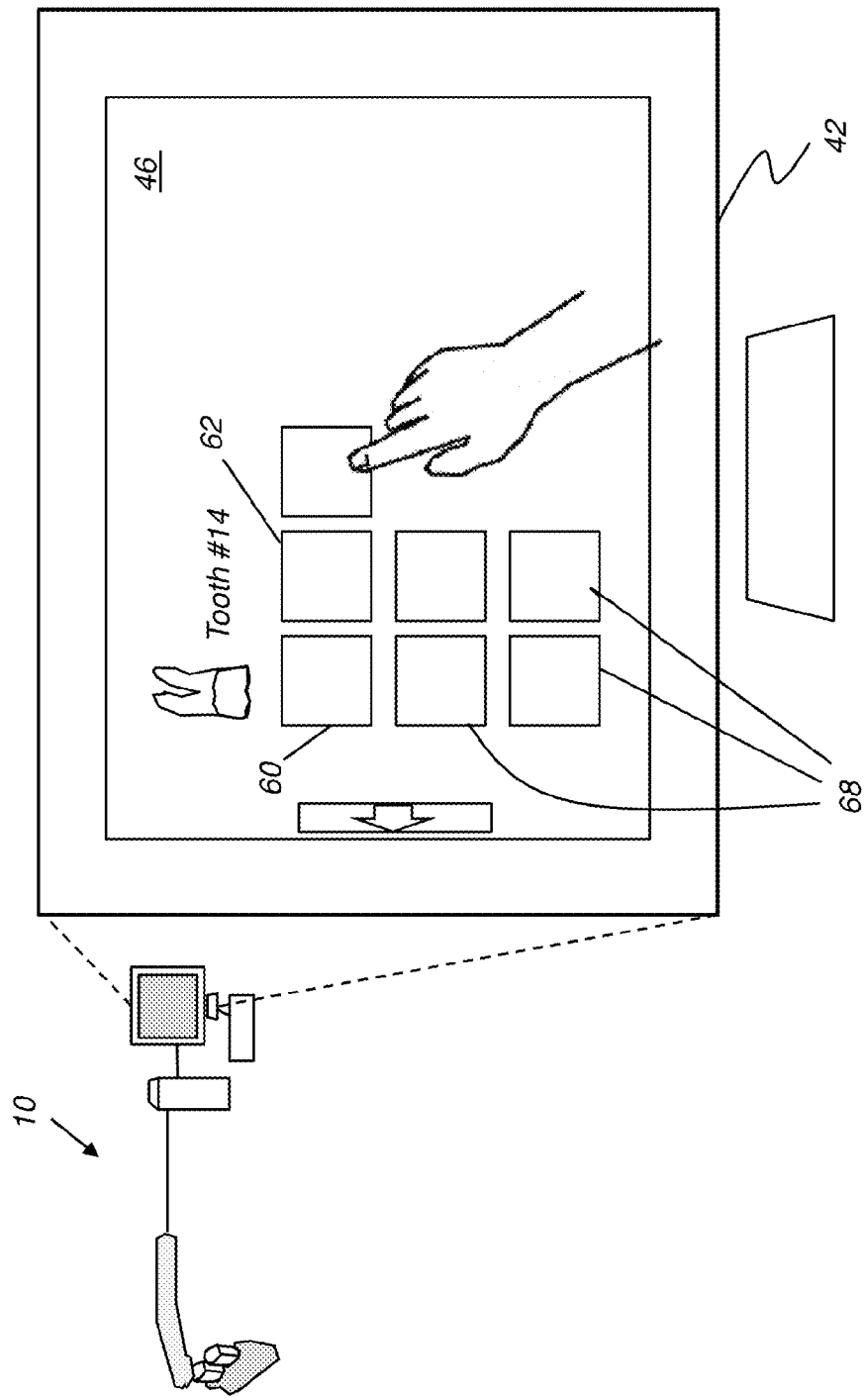
FIG. 13 shows an operator interface screen that relates the various images to each tooth of the patient.

FIGS. 12 and 13 show exemplary operator interface screens 46 that relate the various images of the patient acquired and generated in the process described in the present disclosure to particular teeth 20 for the patient. The presentation shown in FIG. 12 can indicate, using a type of expanded charting system, which images are available for each individual tooth 20. An indicator button 34 is highlighted to indicate which images are available from the dental imaging apparatus 10, such as images listed in FIG. 11, for example. The operator can select to view individual images separately or, optionally, to view multiple images that are associated with an individual tooth 20. The operator can alternately select a processed view of all available images to show one or more detected conditions, such as to show all instances of incipient caries or plaque deposits for multiple teeth. To specify images for viewing, the operator can use a mouse, touch screen input, or other pointer mechanism, selecting from the operator screen as shown.

FIG. 13 shows acquired and processed images 60, 62, 68 available for a typical tooth 20 when using methods of the present disclosure with a charting system. Images can display in thumbnail form, selectable for enlarged viewing using a touch screen, mouse, or other pointer mechanism. According to an embodiment of the present disclosure, the display provides additional information about a detected caries or plaque-related condition, such as a message indicating demineralization or a message indicating some level of bacterial activity. Graphs showing statistical data, such as histograms, for example, can also be available for viewing.

Consistent with one embodiment, the present disclosure utilizes a computer program with stored instructions that perform on image data accessed from an electronic memory. As can be appreciated by those skilled in the image processing arts, a computer program of an embodiment of the present disclosure can be utilized by a suitable, general-purpose computer system, such as a personal computer or workstation. However, many other types of computer systems can be used to execute the computer program of the present disclosure, including networked processors. The computer program for performing the method of the present disclosure may be stored in a computer readable storage medium. This medium may comprise, for example; magnetic storage media such as a magnetic disk such as a hard drive or removable device or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present disclosure may also be stored on computer readable storage medium that is connected to the image processor by way of the internet or other communication medium. Those skilled in the art will readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Displaying an image requires memory storage. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present disclosure may make use of various image manipulation algorithms and processes that are well known. It will be further understood that the computer program product embodiment of the present disclosure may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. In addition, while a particular feature of the invention can have been disclosed with respect to one of several implementations, such feature can be combined with one or more other features of the other implementations as can be desired and advantageous for any given or particular function. Exemplary embodiments according to the application can include various features described herein (individually or in combination). Further, "exemplary" indicates the description is used as an example, rather than implying that it is an ideal. The scope of the invention is indicated by the appended claims, and all changes that come within the meaning and range of equivalents thereof are intended to be embraced therein.

What is claimed is:

1. A method for imaging a tooth, the method executed at least in part by a computer, comprising:
    illuminating the tooth and acquiring reflectance image data of the tooth;
    illuminating the tooth and acquiring fluorescence image data from the tooth;
    aligning the acquired reflectance and fluorescence image data for the tooth to form aligned reflectance and fluorescence image data;
    for one or more pixels of the aligned reflectance and fluorescence image data, generating at least one feature vector having data derived from one or both of the aligned reflectance and fluorescence image data;
    processing the aligned reflectance and fluorescence image data and the at least one feature vector using one or more trained classifiers obtained from a memory that is in signal communication with the computer to generate processed data; and
    displaying, storing, or transmitting the processed data, where the processing results comprise a likelihood mapping indicative of tooth condition, wherein the processing results further comprise a composite image generated from the likelihood mapping and the acquired reflectance or fluorescence image data.

2. The method of claim 1 wherein the at least one feature vector is a multivalued or n-dimensioned data structure, and wherein the at least one feature vector comprises data derived from both the aligned reflectance and fluorescence data.

3. The method of claim 1 further comprising displaying an image that is representative of the acquired reflectance or fluorescence image data.

4. The method of claim 1 wherein generating the at least one feature vector comprises transforming the fluorescence image data from tristimulus to polar color data form.

5. The method of claim 1 wherein the fluorescence image data includes green light in the 490-560 nm range and includes red light with wavelength greater than 600 nm, and wherein generating the at least one feature vector comprises transforming the fluorescence image data from red-green-blue color data to hue-saturation-value color data.

6. The method of claim 1 wherein processing the aligned reflectance and fluorescence image data and the at least one feature vector comprises using a one-dimensional or two-dimensional linear classifier or Gaussian mixture model.

7. Method of claim 1 wherein aligning the acquired reflectance and fluorescence data for the tooth comprises:
    down-sampling the reflectance and fluorescence image data;
    matching image content for at least a first rectangular block in the down-sampled reflectance image data with at least a second rectangular block in the down-sampled fluorescence image data; and
    generating a transformation between the reflectance and fluorescence image data according to the match of image content.

8. A method for imaging a tooth, the method executed at least in part by a computer, comprising:
    acquiring reflectance image data of the tooth;
    acquiring fluorescence image data from the tooth;
    aligning the acquired reflectance and fluorescence data for the tooth;
    identifying at least one feature vector from the acquired reflectance and fluorescence data and forming a composite image using the acquired reflectance and fluorescence image data and the identified feature vector; and
    displaying an operator interface that identifies a plurality of teeth of the patient and, for at least one of the identified teeth, allows operator selection of one or more of the reflectance image data, fluorescence image data, and composite image of the tooth for display, where generating the at least one feature vector comprises transforming the fluorescence image data from tristimulus to polar color data form or to hue-saturation-value color data form.

9. The method of claim 8 wherein identifying at least one feature comprises:
    generating at least one feature vector having data derived from the aligned reflectance and/or fluorescence image data; and
    processing the aligned reflectance and fluorescence image data and the at least one feature vector using one or more trained classifiers to generate results indicative of tooth condition.

10. The method of claim 8 further comprising responding to an operator-entered instruction by displaying, for an identified tooth, one or more of the reflectance image data, fluorescence image data, and composite image of the tooth.

11. The method of claim 8 further comprising displaying a likelihood mapping that shows likelihood of a tooth condition for each of a plurality of teeth.

12. The method of claim 8 further comprising displaying a chart showing one or more teeth for operator identification, wherein the operator selection is made on a camera that is in signal communication with the computer.

13. An interactive dental charting system that displays a plurality of teeth for a patient and, for each displayed tooth, provides a display that enables operator selection of both acquired and processed images for the tooth, wherein the acquired images for each tooth include both a reflectance image and a fluorescence image obtained from an intra-oral camera and wherein the processed images for the tooth include a composite image that is indicative of tooth condition, where the processed images for the tooth include one or more types of images that identify incipient caries, include one or more types of images that identify advanced caries, include one or more types of images that identify dentinal caries, include one or more types of images that identify plaque, and wherein the operator selection includes one, two, three or all of the incipient caries images, the incipient caries images, the dentinal caries images and the plaque images.

14. The system of claim 13 wherein the processed images for the tooth include a likelihood mapping that indicates probability of infection for the selected tooth.

15. The system of claim 13 wherein the dental charting system further enables operator selection of a composite image indicative of tooth condition.

16. The system of claim 15 wherein the display lists the available types of acquired and processed images for each of a plurality of teeth of the patient.

17. An intra-oral imaging apparatus, comprising:
an intra-oral camera configured to acquire both reflectance and fluorescence images of a patient's teeth;
a control logic processor in signal communication with the intra-oral camera and programmed with instructions to obtain and process the reflectance and fluorescence image data and to distinguish incipient caries from advanced and dentinal caries; and
a display in signal communication with the control logic processor for displaying the acquired and processed images and identifying incipient, advanced, and dentinal caries for one or more of the teeth according to processing results, where the display further displays a likelihood mapping for infection of one or more of the teeth, wherein the processor distinguishes caries that does not extend through the tooth enamel from caries that extends through the tooth enamel according to the reflectance and fluorescence image data, where the display shows the types of acquired and processed images that can be displayed for one or more teeth.

18. The apparatus of claim 17, wherein the instructions for processing the image data generate one or more feature vectors, and wherein the control logic processor is part of the intra-oral3 camera.

* * * * *

UNITED STATES PATENT AND TRADEMARK OFFICE
CERTIFICATE OF CORRECTION

PATENT NO. : 9,870,613 B2
APPLICATION NO. : 14/933294
DATED : January 16, 2018
INVENTOR(S) : Yingqian Wu et al.

It is certified that error appears in the above-identified patent and that said Letters Patent is hereby corrected as shown below:

In the Claims

Claim 18, Column 22, Line 24, reads:
"intra-oral3 camera"
And it should read:
--intra-oral camera--.

Signed and Sealed this
Tenth Day of July, 2018

Andrei Iancu
*Director of the United States Patent and Trademark Office*